US012684071B2

(12) United States Patent
Beckwith et al.

(10) Patent No.: US 12,684,071 B2
(45) Date of Patent: Jul. 14, 2026

(54) WIRELESS LOCAL AREA NETWORK EMERGENCY CALL LOCATION UPDATE

(71) Applicant: DISH Wireless L.L.C., Littleton, CO (US)

(72) Inventors: William Beckwith, Washington, DC (US); Darci O'Hearn, Littleton, CO (US); Sougata Saha, Aurora, CO (US); Yohannes Tolossa, Gainesville, VA (US); Mehdi Alasti, Arlington, VA (US); Raghavendra Rao, Littleton, CO (US)

(73) Assignee: DISH Wireless L.L.C., Littleton, CO (US)

( * ) Notice: Subject to any disclaimer, the term of this patent is extended or adjusted under 35 U.S.C. 154(b) by 264 days.

(21) Appl. No.: 18/394,296

(22) Filed: Dec. 22, 2023

(65) Prior Publication Data

US 2024/0422266 A1     Dec. 19, 2024

Related U.S. Application Data

(60) Provisional application No. 63/507,900, filed on Jun. 13, 2023.

(51) Int. Cl.
| | |
|---|---|
| *H04M 3/00* | (2024.01) |
| *H04L 12/66* | (2006.01) |
| *H04M 5/00* | (2006.01) |
| *H04M 7/00* | (2006.01) |
| *H04W 4/029* | (2018.01) |
| *H04W 4/14* | (2009.01) |

(52) U.S. Cl.
CPC ........... *H04M 7/006* (2013.01); *H04W 4/029* (2018.02); *H04W 4/14* (2013.01); *H04M 2242/04* (2013.01); *H04M 2242/30* (2013.01)

(58) Field of Classification Search
CPC ....... H04W 4/90; H04W 76/50; H04W 4/021; H04W 4/02; H04W 4/029; H04W 4/025; H04W 4/14; H04W 8/205; H04W 8/16; H04M 3/5116; H04M 2242/30; H04M 1/72418; H04M 11/04; H04M 2242/14; H04M 1/2535; H04M 3/42348; H04M 7/006; H04M 15/8033
See application file for complete search history.

(56) References Cited

U.S. PATENT DOCUMENTS

| | | | | |
|---|---|---|---|---|
| 11,323,565 B1 * | 5/2022 | Anderson | ........... | H04M 3/2281 |
| 2006/0135177 A1 * | 6/2006 | Winterbottom | ......... | H04W 8/16 |
| | | | | 455/456.1 |

(Continued)

*Primary Examiner* — Kharye Pope
(74) *Attorney, Agent, or Firm* — Kilpatrick Townsend & Stockton LLP

(57) ABSTRACT

Various arrangements for handling a voice over Internet protocol (VoIP) emergency call are provided herein. A VoIP emergency call can be made to a designated emergency phone number from a user equipment (UE). During the VoIP emergency call, location data can be obtained from a presence information data format location object (PIDF-LO) tag. The location data from the PIDF-LO tag can be compared with a registered location mapped to the UE. If determined that the location data indicates a location more than a threshold distance away from the registered location, a registered location update request can be transmitted to the UE.

18 Claims, 7 Drawing Sheets

(56)  References Cited

U.S. PATENT DOCUMENTS

| | | | | |
|---|---|---|---|---|
| 2007/0274299 | A1* | 11/2007 | Ruckart | .................. H04L 12/66 |
| | | | | 370/356 |
| 2008/0101552 | A1* | 5/2008 | Khan | ................. H04L 61/4535 |
| | | | | 370/352 |
| 2008/0200143 | A1* | 8/2008 | Qiu | ........................ H04M 11/04 |
| | | | | 455/404.2 |
| 2011/0064046 | A1* | 3/2011 | Zhu | ......................... H04W 4/20 |
| | | | | 370/331 |
| 2016/0309026 | A1* | 10/2016 | Sterman | ............... H04M 3/5116 |
| 2016/0337831 | A1* | 11/2016 | Piett | .................. H04M 3/42357 |
| 2018/0220275 | A1* | 8/2018 | Mitchell, Jr. | ........... H04W 4/90 |
| 2018/0295479 | A1* | 10/2018 | Hassan | ................. H04W 4/023 |
| 2022/0248203 | A1* | 8/2022 | Anderson | ............. H04W 4/021 |

* cited by examiner

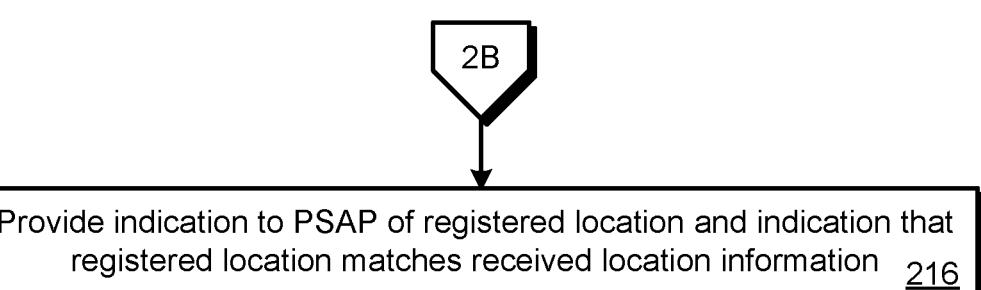

Provide indication to PSAP of registered location and indication that registered location matches received location information  216

FIG. 2B

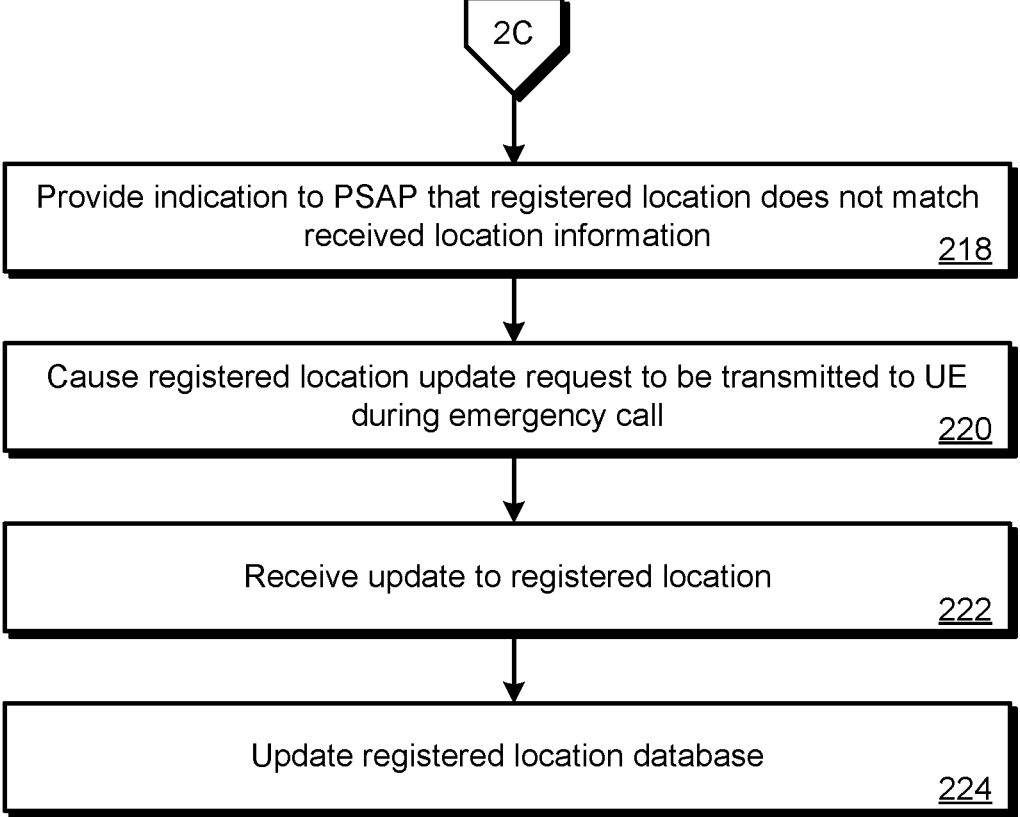

Provide indication to PSAP that registered location does not match received location information  218

Cause registered location update request to be transmitted to UE during emergency call  220

Receive update to registered location  222

Update registered location database  224

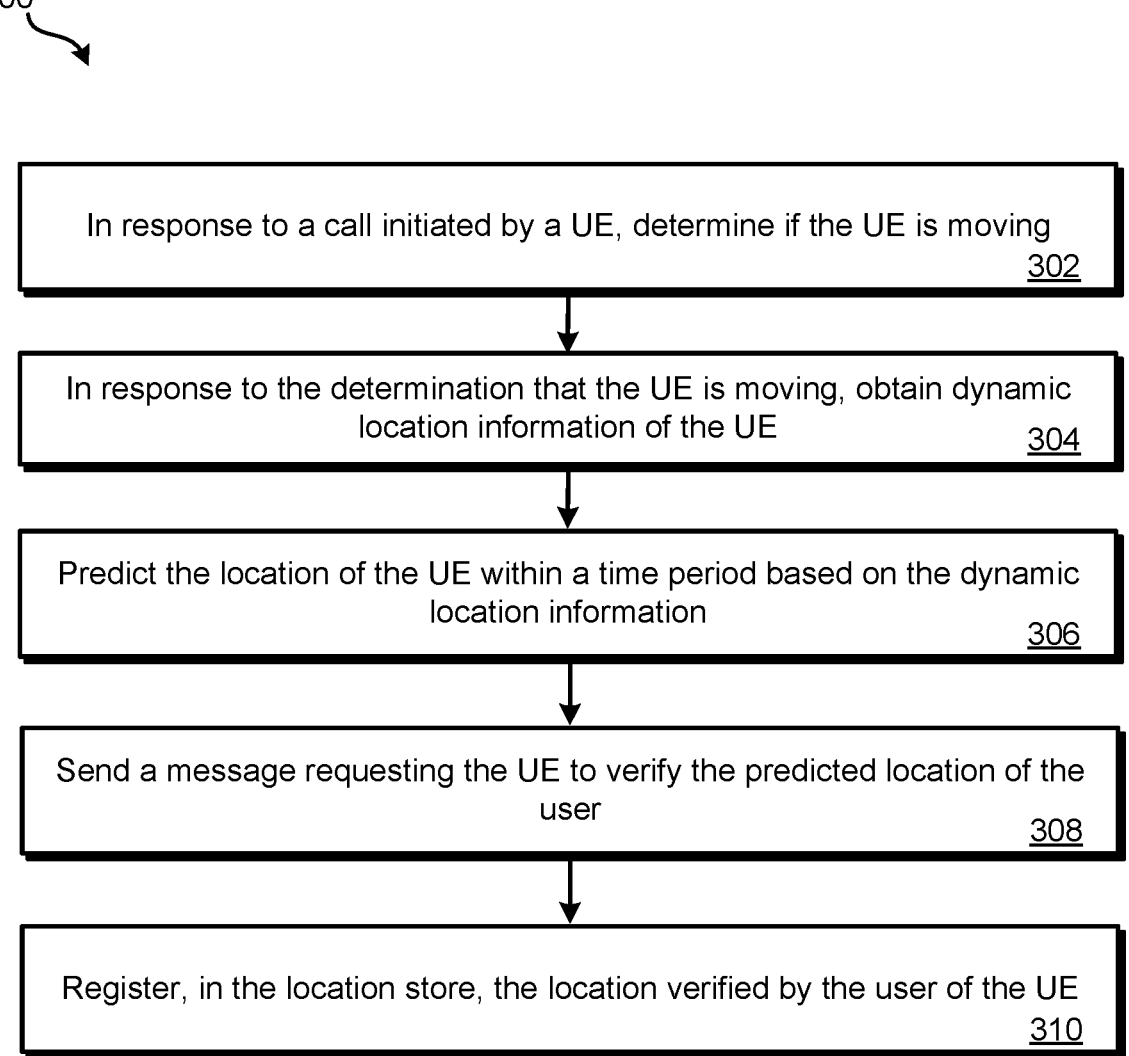

In response to a call initiated by a UE, determine if the UE is moving

302

In response to the determination that the UE is moving, obtain dynamic location information of the UE    304

Predict the location of the UE within a time period based on the dynamic location information

306

Send a message requesting the UE to verify the predicted location of the user

308

Register, in the location store, the location verified by the user of the UE

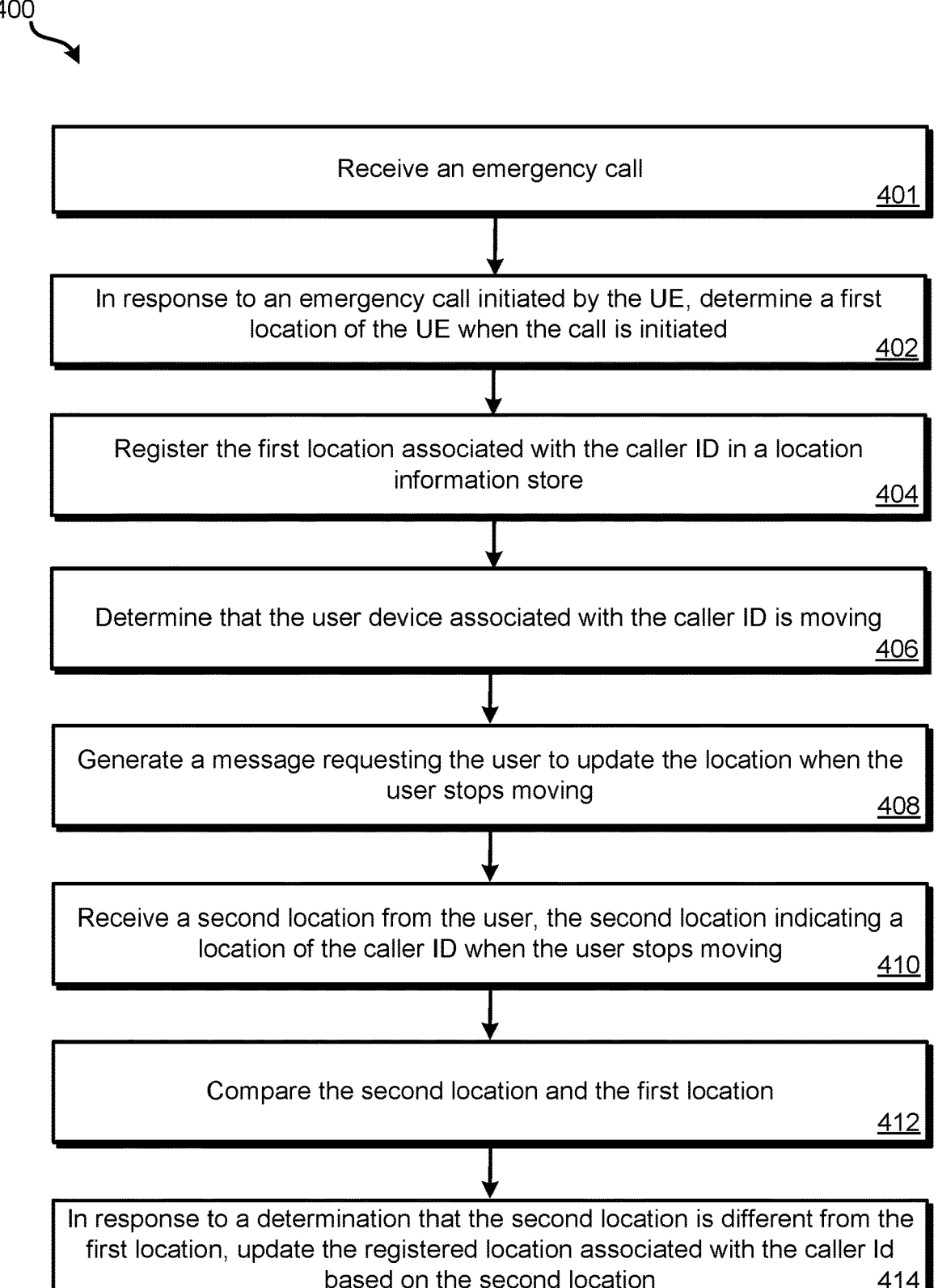

Receive an emergency call

401

In response to an emergency call initiated by the UE, determine a first location of the UE when the call is initiated

402

Register the first location associated with the caller ID in a location information store

404

Determine that the user device associated with the caller ID is moving

406

Generate a message requesting the user to update the location when the user stops moving

408

Receive a second location from the user, the second location indicating a location of the caller ID when the user stops moving

410

Compare the second location and the first location

412

In response to a determination that the second location is different from the first location, update the registered location associated with the caller Id based on the second location     414

FIG. 4

WIRELESS LOCAL AREA NETWORK EMERGENCY CALL LOCATION UPDATE

CROSS REFERENCE TO RELATED APPLICATIONS

This application claims priority to U.S. Provisional Patent Application No. 63/507,900, filed on Jun. 13, 2023, entitled "Wireless Local Area Network Emergency Call Location Update," the disclosure of which is incorporated by reference in its entirety for all purposes.

BACKGROUND

A person in an emergency situation may request help using a user device such as a mobile phone to dial a designated emergency number, such as 911 in the United States or 112 in many European countries, or a direct access phone number for a local emergency service provider (e.g., an emergency dispatch center). This emergency call is assigned by the dispatch center to one or more first responders by the emergency service provider. In order to dispatch emergency personnel to aid the person in the emergency situation, the emergency service provider needs the location of the emergency. However, the person calling for emergency help may not be able to provide their location, location information provided by the caller or the user device may not be complete, the location information may not be sufficiently accurate, or some combination thereof. As a result, emergency service providers can find it challenging to identify and ascertain the real-world location of where the caller and emergency are located. Therefore, it is desired for improving the accuracy of determining the location of the device used by the caller requesting emergency help.

SUMMARY

Various embodiments are described related to a method for handling a voice over Internet protocol (VoIP) emergency call. In some embodiments, a method for handling a voice over Internet protocol (VoIP) emergency call is described. The method may comprise receiving, by a telephony provider system, a VoIP emergency call made to a designated emergency phone number from a user equipment (UE). The method may comprise during the VoIP emergency call, obtaining, by the telephony provider system, location data from a presence information data format location object (PIDF-LO) tag. The method may comprise comparing the location data from the PIDF-LO tag with a registered location mapped to the UE. The method may comprise determining that the location data indicates a location more than a threshold distance away from the registered location. The method may comprise causing a registered location update request to be transmitted to the UE. The registered location update may request an update to the stored registered location.

Embodiments of such a method may include one or more of the following features: the registered location update request may provide an opportunity to accept or decline updating the stored registered location. The method may further comprise in response to acceptance of the opportunity, causing a form to be transmitted to the UE into which an updated location may be provided. The registered location update request may be transmitted to the UE as a wireless application protocol (WAP) message. The registered location update request may be transmitted to the UE as a short message service (SMS) message. The UE may be a cellular phone and the VoIP emergency call may be made by the cellular phone communicating with a wireless local area network (WLAN) to make the VoIP emergency call. The method may further comprise transmitting an indication to the determined PSAP indicating that the registered location does not match the location data obtained from the PIDF-LO tag. The method may further comprise determining a public safety answering point (PSAP) to which to route the VoIP emergency call. The method may further comprise routing the VoIP emergency call to the PSAP. The location data may be created by the UE using global navigation satellite system (GNSS) coordinates and a barometric pressure measurement.

In some embodiments, a system for handling a voice over Internet protocol (VoIP) emergency call, is described. The system may comprise a telephony provider system, comprising a VoIP call engine and an emergency call router system. The telephony provider system may be configured to receive a VoIP emergency call made to a designated emergency phone number from a user equipment (UE). The telephony provider system may be configured to, during the VoIP emergency call, obtain location data from a presence information data format location object (PIDF-LO) tag. The telephony provider system may be configured to compare the location data from the PIDF-LO tag with a registered location mapped to the UE. The telephony provider system may be configured to determine that the location data indicates a location more than a threshold distance away from the registered location. The telephony provider system may be configured to cause a registered location update request to be transmitted to the UE. The registered location update may request an update to the stored registered location.

Embodiments of such a system may include one or more of the following features: the registered location update request may provide an opportunity to accept or decline updating the stored registered location. In response to acceptance of the opportunity, the telephony provider system may cause a form to be transmitted to the UE into which an updated location information may be provided. The registered location update request may be transmitted to the UE as a wireless application protocol (WAP) message. The registered location update request may be transmitted to the UE as a short message service (SMS) message. The telephony provider system further comprises a cellular network. The system may further comprise the UE. The UE may be a cellular phone and the VoIP emergency call may be made by the cellular phone communicating with a wireless local area network (WLAN) to make the VoIP emergency call. The location data may be created by the UE using global navigation satellite system (GNSS) coordinates and a barometric pressure measurement. The telephony provider system may be further configured to transmit an indication to the determined PSAP indicating that the registered location does not match the location data obtained from the PIDF-LO tag. The telephony provider system may be further configured to determine a public safety answering point (PSAP) to which to route the VoIP emergency call. The telephony provider system may be further configured to route the VoIP emergency call to the PSAP.

In some embodiments, a non-transitory processor-readable medium is described. The medium may comprise processor-readable instructions configured to cause one or more processors to receive a VoIP emergency call made to a designated emergency phone number from a user equipment (UE). The medium may comprise processor-readable instructions configured to cause one or more processors to, during the VoIP emergency call, obtain location data from a presence information data format location object (PIDF-LO) tag. The medium may comprise processor-readable instructions configured to cause one or more processors to compare the location data from the PIDF-LO tag with a registered location mapped to the UE. The medium may comprise processor-readable instructions configured to cause one or more processors to determine that the location data indicates a location more than a threshold distance away from the registered location. The medium may comprise processor-readable instructions configured to cause one or more processors to cause a registered location update request to be transmitted to the UE. The registered location update may request an update to the stored registered location.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIGS. 2A, 2B, and 2C illustrate a method for routing emergency calls and maintaining an up-to-date registered location database.

FIG. 3 illustrates an embodiment of a method for communicating location information regarding a piece of user equipment (UE).

FIG. 4 illustrates an embodiment of a method for communicating location information regarding a piece of UE.

DETAILED DESCRIPTION

Figure 1:
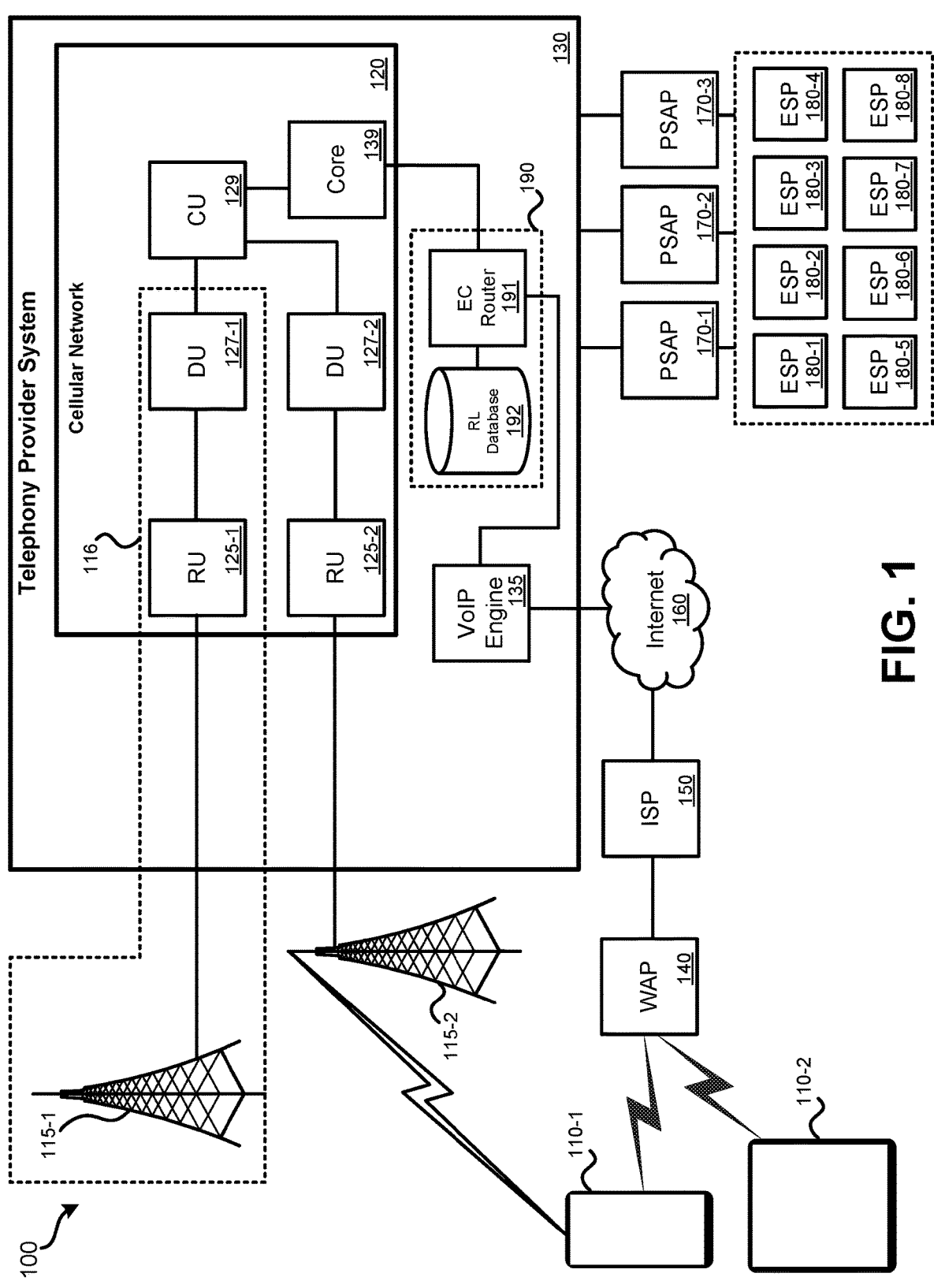
FIG. 1 illustrates a schematic block diagram illustrating an embodiment of a communication system for routing emergency calls and maintaining an up-to-date registered location database.

Location information associated with a device (e.g., cellular phone) used to place an emergency call needs to be accurate so that appropriate help can be dispatched to the caller at the physical location indicated by the location information. Typically, during an emergency call, location information about one or more callers needs to be readily available to an operator such as a person answering the emergency call at the call center such as the public safety answering point (PSAP) or other designated call center (e.g., a state or local emergency call dispatch center) staffed with personnel that answer and process emergency calls.

Location databases can be used to store registered location information associated with the caller and/or the user equipment, and the registered location information in the location databases are provided or made accessible to operators of call centers that handle the emergency calls. Using the registered location information, a given operator can dispatch help to the caller in response to the emergency call.

Emergency calls can be placed by a variety of means. A cellular phone may, by default, attempt to use its home cellular network to place an emergency call. If another cellular network has a higher signal strength, this other cellular network may be used instead (e.g., in some jurisdictions, cellular networks are required to accept all emergency phone calls, regardless of whether the emergency call is placed from a device of a subscriber or even if the cellular phone is associated with an any active subscription). In still other situations, a device may not have cellular network access, but may have access to a wireless local area network (WLAN) through which the Internet can be accessed. As an example, a computerized device can access the Internet via a WiFi network; as another example, a cellular phone may have no cellular signal with any cellular network, but may be connected with a WLAN. In such situations, having a stored database of registered locations may be particularly useful to emergency dispatchers-wireless networks may tend to not move; therefore, a registered location can tend to remain accurate when the WLAN is used for an emergency call.

A challenge exists if an emergency call is made from a location that is not the registered location, which can be referred to as a "non-registered location." When an emergency call is made, the geographic location, which, for example, can be identified by Cartesian coordinates providing latitude, longitude, and altitude on the Earth, or X, Y, and Z coordinates, can usually be provided by the emergency caller's device. However, if the emergency call is made from a non-registered location, the call center (e.g., PSAP) may dispatch help to the registered location, where the emergency and the person placing the emergency call are not located. In addition, because the registered location and the non-registered location may correspond to different PSAP jurisdictional boundaries, routing to a PSAP based on a registered location when the caller is located in a non-registered location could result in the PSAP with appropriate jurisdiction and resources for the caller's actual location not receiving the call, which can lead to delays and errors.

Additionally, after the emergency call is initiated, the user may move or continue to move during communication with the call center. For example, the user may move across a river, a city border or a state border, or move among floors in a building (e.g., skyscraper). In this scenario, the user may move from a registered location to a non-registered location. If the registered location is not timely updated, the emergency call may again here not be properly routed to the PSAP with responsibility for the area from which the person is calling and the true location of the user may not be accurately identified by the operator of the PSAP, possibly resulting in emergency services being sent to the wrong location (e.g., wrong floor of a building).

Furthermore, various jurisdictions worldwide require that a database of registered locations be maintained and kept accurate. A network provider (e.g., a cellular network provider, ISP) that allows for WLAN access (e.g., IP calls via the WLAN) and emergency calls may be required to maintain an up-to-date registered location database and require that the registered locations be updated when an emergency call is placed from a location that does not match the registered location.

In various embodiments detailed herein, the present disclosure provides techniques for solving the above-mentioned challenges, especially with relation to emergency calls placed via a WLAN using voice over IP (VoIP). In some embodiments detailed herein, when an emergency call is initiated, the actual geographic location provided by the UE is compared with the registered location on record to determine whether the geographic location of the device making the emergency call is different from the registered location. According to some embodiments herein, if a difference is identified, the registered location can be either automatically updated or the caller can be prompted to update their registered location.

Some embodiments detailed herein can be used to obtain the dynamic location information of the caller's device when the caller's device (and, thus, caller) is moving after the emergency call is initiated. As an example, an emergency call may be placed from a vehicle. In some embodiments, the location of the caller can be occasionally or periodically updated, or even predicted based on the dynamic location information.

"Location information," which is indicative of the location of the device from which an emergency call is placed, can be based on data obtained from a global navigation satellite system (GNSS), such as the global positioning system (GPS) or Galileo system, or GLONASS system coordinates if the device has an on-board GNSS receiver (e.g., GPS receiver). For example, a smart phone or other computerized device can provide its geographic location information as two dimensional coordinates or, possibly, three dimensional coordinates if signals can be received from a sufficient number of satellites. In some embodiments, an altitude of the device may be determined using a separate component of the device, such as a barometric sensor that provides a pressure measurement. The pressure measurement can be used to determine height above ellipsoid (HAE) to estimate the device's altitude.

Additionally or alternatively, location information can also involve cellular tower triangulation techniques employed by facilities-based wireless telecommunications networks. Cellular tower latitude and longitude with or without azimuth, or other horizontal location technologies such as mapped WiFi hotspots or RF identification with beacons, or some combination of these location technologies can be used for location information on the device. Another possibility is location information obtained by assisted GNSS ("A-GNSS"), of which an example is A-GPS. In A-GNSS, a communication channel is used to provide the device with data necessary to being receiving GNSS data from the GNSS satellites, thus decreasing start up time.

As used herein, "registered location information" refers to location information registered in a location database. Registered location information can include address information or other information sufficient to determine a location (e.g., a description of a location from a known landmark, coordinates). The registered location can be intended to correspond to an address at which a WLAN is installed. Therefore, if an emergency call is placed via the WLAN, if the WLAN remains installed at the same address, it can be assumed that the emergency call is originating from this same address. While "registered location information" is intended to be correct, embodiments detailed herein are used to determine whether the "registered location information" is consistent with the "actual location" from which the emergency call is being placed. "Actual location" refers to the correct, real-world location from which the emergency call is being placed.

Details of these embodiments and other embodiments are provided in relation to the figures. FIG. 1 illustrates an embodiment of a communication system 100 ("system 100"). System 100 can include a 5G New Radio (NR) cellular network; other types of cellular networks, such as 4G LTE, 6G, 7G, etc. are also possible. System 100 can include: UE 110 (UE 110-1, UE 110-2); base station 115; telephony provider system 130; cellular network 120; radio units 125 ("RUs 125"); distributed units 127 ("DUs 127"); centralized unit 129 ("CU 129"); VoIP Engine 135; core 139, wireless access point (AP) 140; internet service provider (ISP) 150, Internet 160, PSAPs 170; and emergency service providers (ESPs) 180. FIG. 1 represents a component level view. In a virtualized open radio access network (O-RAN), because components can be implemented as software in the cloud, except for components that need to receive and transmit RF, the functionality of various components can be shifted among different servers, for which the hardware may be maintained by a separate (public) cloud-service provider, to accommodate where the functionality of such components is needed.

UE 110 can represent various types of end-user devices, such as smartphones, cellular modems, tablet computers, cellular-enabled computerized devices, gaming devices, or any computerized device capable of placing an emergency communication (e.g., call, SMS text), such as to 911 in the United States. UE 110 may be capable of communicating via cellular network 120, such as smartphone 110-1 or may not be capable of communicating via cellular network 120, such as tablet computer 110-2. In the example of FIG. 1, cellular network 120 is part of telephony provider system 130. Telephony provider system 130 can also provide VoIP services via VoIP engine 135. In other embodiments, telephony provider system 130 may provide exclusively VoIP services.

UE 110 may use RF to communicate with various base stations of cellular network 120. As illustrated, two base stations 115 (BS 115-1, 115-2) are illustrated. Real-world implementations of system 100 can include many (e.g., hundreds, thousands) of base stations, and many RUs, DUs, and CUs. BS 115 can include one or more antennas that allow RUs 125 to communicate wirelessly with UEs 110. RUs 125 can represent an edge of cellular network 120 where data is transitioned to wireless communication. The radio access technology (RAT) used by RU 125 may be 5G New Radio (NR), or some other RAT, such as 4G Long Term Evolution (LTE). The remainder of cellular network 120 may be based on an exclusive 5G architecture, a hybrid 4G/5G architecture, a 4G architecture, or some other cellular network architecture. Base station equipment 121 may include an RU (e.g., RU 125-1) and a DU (e.g., DU 127-1) located on site at the base station. In some embodiments, the DU may be physically remote from the RU. For instance, multiple DUs may be housed at a central location and connected to geographically distant (e.g., within a couple kilometers) RUs.

One or more RUs, such as RU 125-1, may communicate with DU 127-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, band 71. One or more DUs, such as DU 127-1, may communicate with CU 129. Collectively, RUs, DUs, and CUs create a gNodeB, such as gNodeB 116, which serves as part of the radio access network (RAN) of cellular network 120. CU 129 can communicate with core 139. The specific architecture of cellular network 120 can vary by embodiment.

At a high level, the various components of a gNodeB can be understood as follows: RUs perform RF-based communication with UE. DUs support lower layers of the protocol stack such as the radio link control (RLC) layer, the medium access control (MAC) layer, and the physical communication layer. CUs support higher layers of the protocol stack such as the service data adaptation protocol (SDAP) layer, the packet data convergence protocol (PDCP) layer and the radio resource control (RRC) layer. A single CU can provide service to multiple co-located or geographically distributed DUs. A single DU can communicate with multiple RUs.

The operator of cellular network 120 may permit UE associated with cellular network 120 to place VoIP calls via the Internet. Such an arrangement may be particularly useful to lower the volume of calls placed via the RAN of cellular network 120 and to improve coverage in areas where the RAN of cellular network 120 has a weak signal. As illustrated, smartphone 110-1 can communicate wirelessly with AP 140. AP 140 may host a wireless network, such as a WiFi network, through which smartphone 110-1 may use various protocols such as TCP/IP to communicate with remote computing systems via Internet 160. When placing a call, UE 110 may communicate with cellular network 120 (or some other VoIP provider) via AP 140, ISP 150, and Internet 160. In some embodiments, ISP 150 may be cellular network 120. For example, a 5G modem may be connected with or integrated with AP 140 to allow Internet access and VoIP calling via AP 140 to various computerized devices.

When an emergency call is placed using a cellular device, such as smartphone 110-1, the default may be to use any available cellular network having sufficient signal strength or a cellular network having the greatest signal strength. Therefore, VoIP may be avoided and a cellular call may be placed via cellular network 120. However, in some circumstances, all cellular networks, including cellular network 120, may not be reachable for an emergency call (or, the device from which the emergency call was placed is not capable of communicating with a cellular network). In such a situation, VoIP via AP 140 may be used by both cellular enabled devices, such as smartphone 110-1, and non-cellular devices, such as tablet computer 110-2.

For such a VoIP-based emergency call, the emergency call may be routed via AP 140, ISP 150, and Internet 160 to the entity hosting the emergency call, which is in this case cellular network 120. Telephony provider system 130 may host emergency call routing system 190. In some embodiments, emergency call routing system 190 may reside outside of telephony provider system 130 and be maintained by a separate entity. Emergency call routing system 190 serves to: 1) ensure that a received emergency call is routed to the appropriate PSAP; and 2) maintain an up-to-date registered location database.

When a VoIP-based emergency call is received by VoIP engine 135, the emergency call can be routed to emergency call (EC) router 191 of emergency call routing system 190. EC router 191 may compare location information associated with the VoIP-based emergency call with registered location data stored for UE 110 or AP 140 from which the call was received. The location of the UE may be determined based on a PIDF-LO (Presence Information Data Format Location Object) message being transmitted by the UE. For emergency calls, PIDF-LO allows for location information to be transmitted by the UE as part of the session invitation protocol (SIP) invite message. As previously detailed, the location information used for the PIDF-LO tag may be obtained using GNSS measurements, barometric measurements, or sources, or some combination thereof by UE 110.

Upon receipt of the SIP invite message, the location information from the PIDF-LO tag may be extracted and compared to the associated registered location stored in registered location (RL) database 192. A threshold distance can be used to determine whether the registered location information matches the location data received from the UE. For example, the threshold distance could be 50 meters or some other value between 10 meters and 150 meters. In this example, if the registered location is less than 50 meters from the location indicated by the location information, the user may be determined to be at the registered location; if more than 50 meters away, the user may be determined to be at a new location. To be clear, the threshold distance can factor in all three dimensions; therefore, altitude, at least in some geographic regions, is factored in when determining whether within the threshold distance. In some embodiments, the threshold distance can vary based on the method by which the location of the UE is determined, for example a smaller threshold can be used for GNSS systems compared to using triangulation of cellular network towers. In other embodiments, the threshold distance is between 5 and 100 meters. Different threshold distances may be used for different directions. For example, while 50 meters may be used for the X and Y directions, the threshold for Z may be much smaller, such as 3 meters (or between 2 and 5 meters) to account for the UE being on a different floor of a building. Location data within RL database 192 may be stored as an address or coordinates. An address may be easily converted into coordinates using various mapping systems; similarly, coordinates can be converted into an address using similar mapping systems.

EC router 191 can use the location information and/or registered location information to determine the proper PSAP of PSAPs 170 to which the emergency call should be routed. As illustrated three PSAPs 170 are illustrated by way of example only. A large number of PSAPs can exist nationwide and worldwide. When the call is routed to a PSAP, information may be included indicating that the registered location does or does not match the location data obtained from the PIDF-LO tag. The PSAP may also be provided with the location information obtained from the PIDF-LO tag. The PSAP handling the call may then determine whether to dispatch, and which ESP should be dispatched. As illustrated, eight ESPs 180 are present. The true number of available ESPs nationwide and worldwide are much greater. For example, an ESP of ESPs 180 may be: a city's fire department, the state police, the coast guard, a county's sheriff department, a town's volunteer ambulance department, etc.

When the registered location is determined by EC router 191 to match the location information received in the PIDF-LO tag, no additional action may need to be taken by EC router 191. However, when the registered location is determined by EC router 191 to not match the location information received in the PIDF-LO tag within a defined threshold distance, additional action may need to be taken. Some jurisdictions, such as the United States, require that an opportunity be provided for the registered location to be updated, even while the emergency call is ongoing.

Therefore, in some embodiments, while the emergency call is ongoing, EC router 191 (or another component of cellular network 120) may cause data to be transmitted to the UE from which the emergency call originated that requests that the user update the registered location.

Various mechanisms may be used to prompt a user to update the registered location. In a first set of embodiments, a wireless application protocol (WAP) message may be sent to the UE. The WAP message is a form of short message service (SMS) message in which a header of the SMS message links to a WAP address. Upon receiving the WAP message, the UE gives the end user the option to access the WAP content linked by the WAP address. At the user's discretion, upon selecting the option, the user could be presented with an interface (e.g., webpage) through which the registered address can be updated. If the user updates the address, the registered location stored by RL database 192 is updated.

In a second set of embodiments, an SMS message (or MMS message) may be used. The SMS message may be sent to the phone that includes a message that asks the user to access a link to update their registered location. The user may then, at the user's discretion, access the link and perform the update. If the user updates the address, the registered location stored by RL database 192 is updated.

In a third set of embodiments, messaging may be performed using an alternate arrangement, such as via TCP/IP and HTTP. A push message can be transmitted to UE that causes a dialog to be presented, with which a user can interact (e.g., accept an offer to update a registered location or decline). Whether via push or HTTP, the UE may be able to be otherwise triggered to access a particular webpage or present content to the user that gives the user, at the user's discretion, the ability to update the registered location. If the user updates the address, the registered location stored by RL database 192 is updated.

In a fourth set of embodiments, the registered location may be updated automatically. In such embodiments, the data from the PIDF-LO tag may be either stored as coordinates or converted to an address for storage in RL database 192. Occasionally or periodically (e.g., every 10 seconds, 15 seconds, 30 seconds), while the VoIP emergency call is ongoing, the UE that originated the emergency call may be triggered to send a refreshed PIDF-LO tag. Such messages can capture movement of the UE since the emergency call began. Such arrangement may be particularly beneficial if the WLAN through which the VoIP emergency call is made is present on a vehicle, such as a commuter bus or even a personal vehicle. In such embodiments, the user may be prompted to approve such tracking via an on-screen message (e.g., a WAP message).

Figure 5:
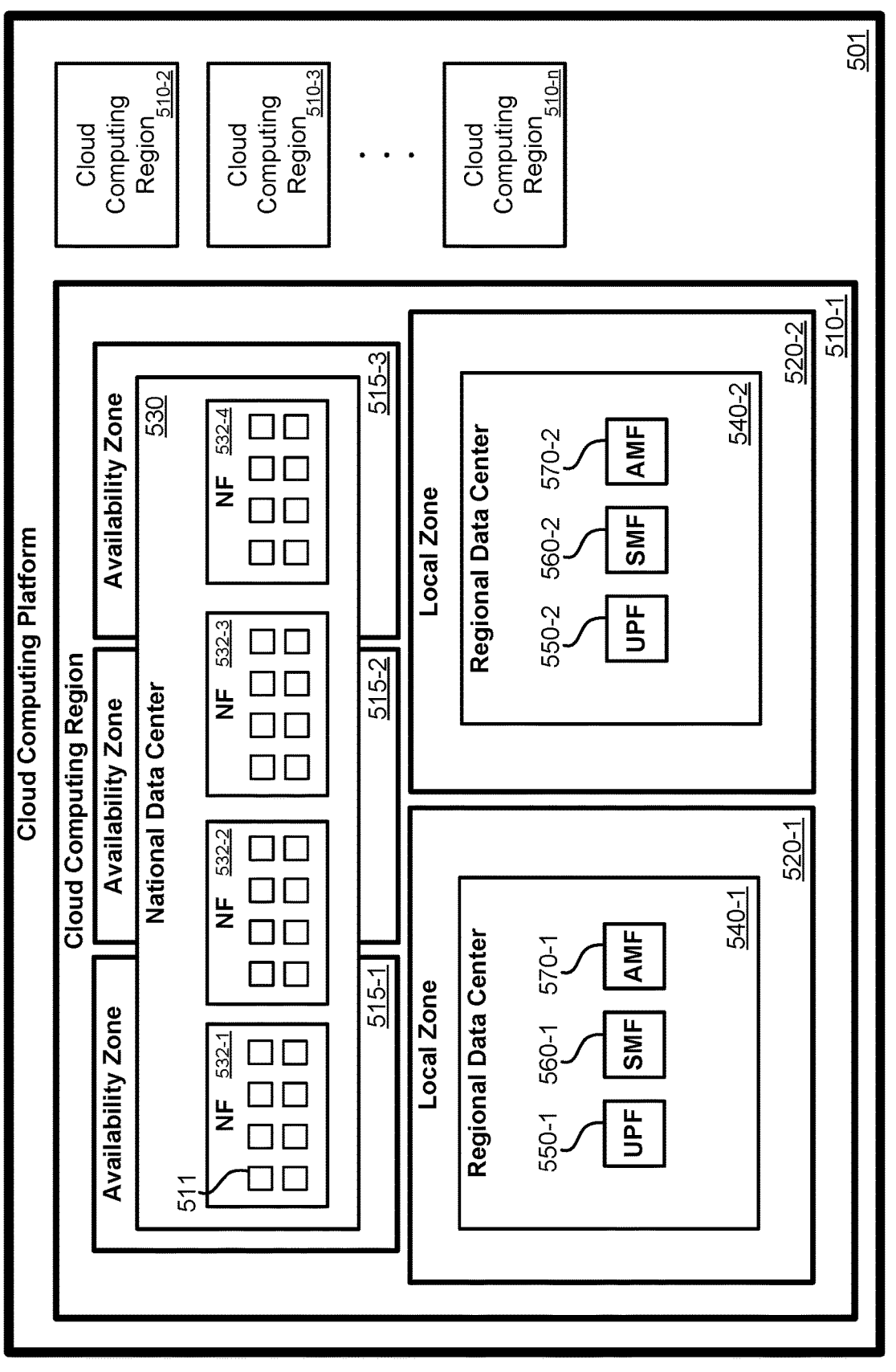
FIG. 5 illustrates an embodiment of a cellular network core network topology as implemented on a public cloud-computing platform.

Further detail regarding various embodiments of cellular network 120 is provided in relation to FIG. 5. Notably, some components of cellular network 120 can be implemented on a cloud computing platform as opposed to implemented on dedicated special-purpose hardware. However, dedicated general-purpose or special-purpose hardware can also be used in various embodiments.

Figure 2A:
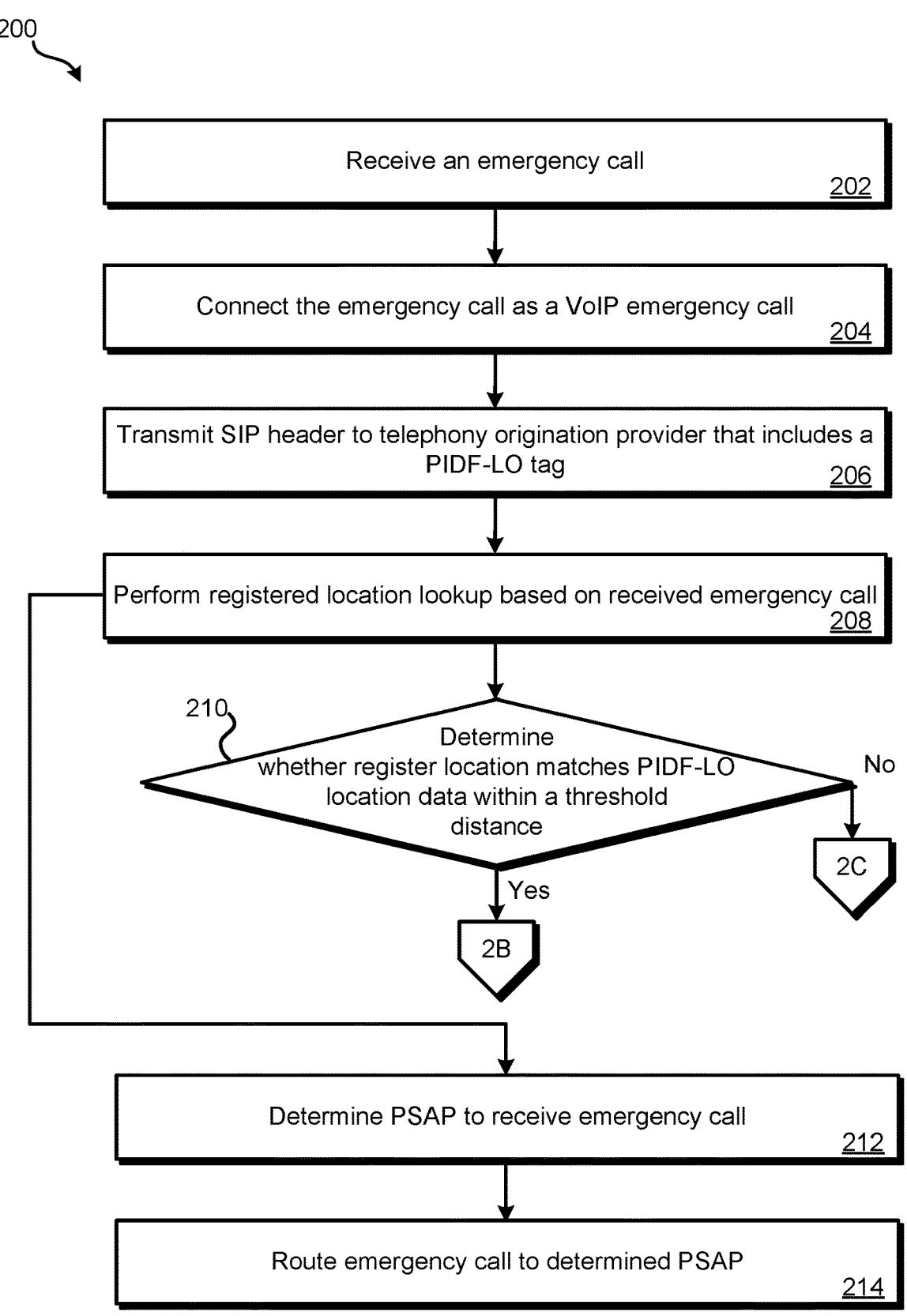

Various methods can be performed using the system embodiments detailed in relation to FIG. 1. FIGS. 2A, 2B, and 2C illustrate a method 200 for routing emergency calls and maintaining an up-to-date registered location database. Method 200 can be performed using system 100 of FIG. 1. More specifically, blocks of method 200 may be performed by EC router 191 of cellular network 120 or by some other component residing within telephony host 122.

At block 202, a request for an emergency call is received by a UE and placed via either a WLAN or cellular network. The emergency call may be initiated by a user entering a special phone number, which can vary by jurisdiction, into the UE (e.g., 911, 112). Alternatively, the user may select a button or icon labelled "emergency" or similar. In response to receiving the emergency call request, the UE may determine how to route the emergency call. If the UE is a cellular phone, a home cellular network may first be checked for signal strength. Other cellular networks, which the UE would not have permission to use for non-emergency calls, may also be checked for signal strength. If no cellular network is available or has sufficient signal strength, if a WLAN connection, such as a WiFi connection, is available, the emergency call can be connected as a VoIP call at block 204. In some embodiments, rather than a call, the communication via the WLAN may be a text message, such as an SMS or MMS message.

At block 206, the SIP header may be transmitted to the telephony origination provider that is hosting the VoIP call or message. In some embodiments, the originating telephony provider may receive an emergency call request that includes a SIP header. Within the SIP header can be a PIDF-LO tag that provides location data obtained from the UE. The location data, as previously detailed, can include: GNSS coordinates, barometric pressure measurements, and/or other data that can be used to locate the UE from which the call originated.

At block 208, a registered location lookup in association with the UE (or user of the UE) is performed. The registered location lookup can be performed directly by the telephony origination provider or may be performed by a third-party system on behalf of the telephony origination provider. At block 212, based on the location data included in the PIDF-LO tag, a PSAP responsible for the region where the UE is located is determined. At block 214, the emergency call is routed to the determined PSAP. The location derived from the PIDF-LO tag and/or registered location may be provided to the PSAP. The PSAP then handles the call and dispatches one or more ESPs as needed.

At block 210, a determination is made either by the emergency telephony origination provider or by a third-party entity on behalf of the emergency telephony origination provider as to whether the location data obtained from the PIDF-LO tag in the SIP header is within a threshold distance of a stored registered location within a RL database. If determined to be within the threshold distance, the VoIP emergency call is considered as having been made from the registered location and no update to the RL database is needed. As shown in FIG. 2B, at block 216, the PSAP can be provided with an indication of the registered location by the emergency telephony origination provider or by a third-party entity on behalf of the emergency telephony origination provider. In some embodiments, the PSAP is also provided with an indication that the registered location was determined to match the location data in the PIDF-LO tag. In some embodiments, additional information may be provided, such as information indicative of a probability that the registered location is accurate or the method through which the location data was obtained.

Returning to block 210, if determined to be outside the threshold distance, the VoIP emergency call is considered as having been made from a new location and the registered location needs to be updated. As shown on FIG. 2C, an indication can be provided by the emergency telephony origination provider or by a third-party entity on behalf of the emergency telephony origination provider to the PSAP indicating that the PIDF-LO tag data does not match the stored registered location from the RL database at block 218 of FIG. 2C. In some embodiments, an indication of the registered location is still provided to the PSAP.

While the VoIP emergency call is ongoing (or at some other time relatively soon, which may be defined by regulation or law) a request to update the registered location is transmitted to the UE. As previously detailed, the request can be sent via multiple arrangements, such as: SMS text, a WAP message, a push message, or an HTTP message. At block 222, either while on the call or at some time in the future when a user of the UE decides to do so, the registered location for the UE, WLAN, or user can be updated, such as by the user completing a form accessible via a link or other arrangement provided to the UE at block 220. The user can be provided with an option to update the registered location. For example, the user may be able to respond yes or no. If the response "no" is received, a record of the user declining to update the registered location may be stored as proof that the necessary steps were performed to satisfy local laws and regulations. If a "yes" response is received, a second interface may be presented, such as a webpage, that allows the user to update the registered address.

At block 224, the RL database maintained by the emergency telephony origination provider or by a third-party entity on behalf of the emergency telephony origination provider is updated to include the updated location information provided by the user.

Figure 2D:
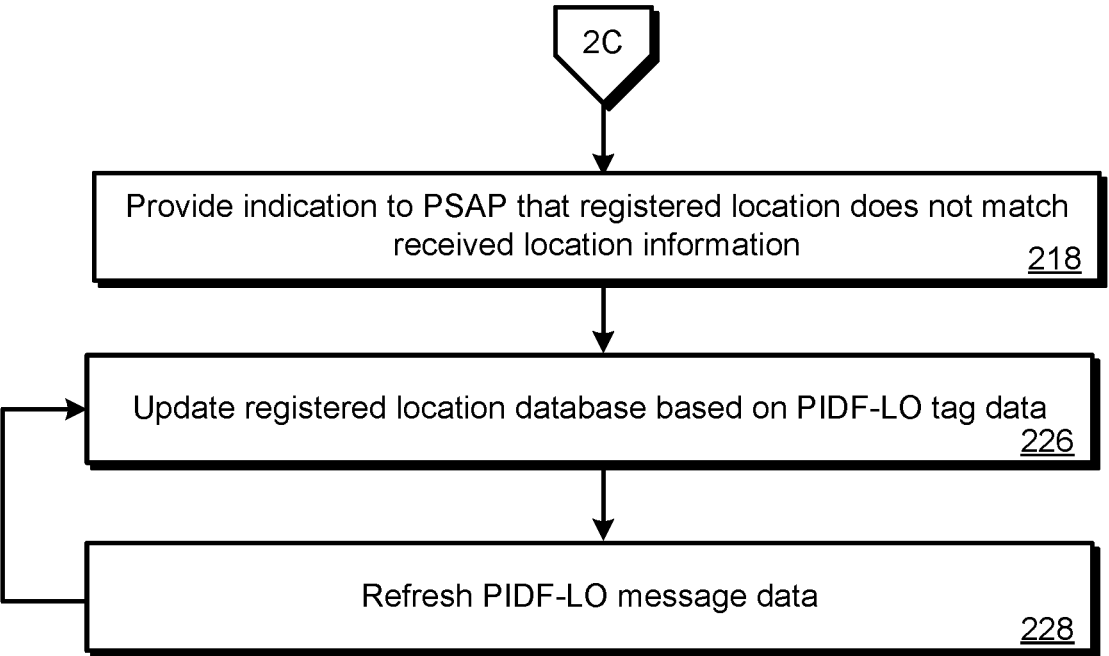
FIG. 2D illustrates another embodiment of a method for maintaining an up-to-date registered location database.

FIG. 2D illustrates an alternative embodiment that can replace the blocks of FIG. 2C. An indication can be provided by the emergency telephony origination provider or by a third-party entity on behalf of the emergency telephony origination provider to the PSAP indicating that the PIDF-LO tag data does not match the stored registered location from the RL database at block 218. In some embodiments, an indication of the registered location is still provided to the PSAP. The location derived from the PIDF-LO tag may be provided to the PSAP.

At block 226, the RL database can be updated without user input based on the PIDF-LO tag from the SIP header. This location data, which may be in the form of coordinates, can be translated into an address using various mapping databases. At block 228, occasionally or periodically, such as between every 4 and 60 seconds, the UE may transmit a refreshed PIDF-LO tag or message. This refreshed tag can be transmitted in response to a request transmitted by the emergency telephony origination provider or by a third-party entity on behalf of the emergency telephony origination provider. Alternatively, the UE can be configured to automatically transmit the refreshed tag. As the PIDF-LO tag is refreshed and transmitted, the RL database may continue to be automatically updated to accurately reflect the registered location of the UE, user, and/or WLAN through which the VoIP emergency call is being made. In some embodiments, even if the registered location is determined to match the PIDF-LO tag data at block 210, updates may be made during the emergency call in response to the UE moving around. The PSAP may receive indications of the updated location data from the refreshed PIDF-LO tag.

In the arrangement of FIG. 2D, the user does not need to manually update the registered location at all or at least while the emergency call is ongoing. Rather, sometime after the emergency call, the user may be provided with an opportunity to update or confirm the registered location (as detailed in blocks 220-224), with the RL database being updated in accordance with the user's input.

FIG. 3 is a flow diagram illustrating an example method 300 for communication of location information, according to various embodiments, which may be performed for VoIP emergency calls. The method 300 may be implemented by a communication system described herein. It can be noted that, as with figures appended hereto, FIG. 3 is provided as a non-limiting example. Other embodiments may vary, depending on desired functionality. Blocks of method 300 can be performed using system 100 of FIG. 1.

At block 302, in response to a call initiated by a UE, a determination is made on whether the UE is moving at more than a threshold velocity after the call has been initiated. For example, the UE may be in a moving vehicle, and the call is initiated by the user/caller while the UE is moving with the vehicle. In some embodiments, SIP headers are periodically (e.g., once per 20 milliseconds) transmitted to the positioning system after the call is initiated, each SIP header including a location of the UE when the corresponding SIP header is sent. By monitoring the locations included in the periodic SIP header, it can be determined, for example, by the positioning system, whether the UE is moving at more than a threshold rate or velocity.

At block 304, in response to the determination that the UE is moving, dynamic location information of the UE is obtained. The dynamic location information may include the moving speed of the UE, the moving direction of the UE, the route of the UE, the estimated position of the UE at a future time point based on the speed, moving direction, and/or the route of the UE, and so on. In order to obtain the dynamic location information, repeated requests for PIDF-LO tags or messages may be sent to the UE. Alternatively, the UE may be instructed to send such messages to periodically.

At block 306, the location or a range of the location of the UE after the UE moves for a time period is predicted. The time period may be the time needed for the emergency dispatcher to arrive at the location of the UE. In some embodiments, before the UE stops moving, no further SMS or WAP message is sent to the UE requesting the updated location.

At block 308, a message is sent to the UE in response to a determination that the UE has stopped moving and/or is in a static state. The message includes an inquiry on whether the predicted location is the current location where the UE stops moving. In some embodiments, the message includes a request for verifying that the predicted location is the current location of the UE. The message may further include "Y/N" options for the user/caller to select. If the user/caller selects "Y," the predicted location is the current location. If the user/caller can select "N," an additional message may be sent to the UE to request the current location of the UE where the UE stopped moving. A response to the additional inquiry message may be sent from the UE, the additional inquiry message indicating the current location of the UE. A user may also decline to provide an updated location, which can be logged for regulatory reasons.

At block 310, the location verified by the user/caller of the UE is registered in the registered location database as the updated location. As mentioned above, the location verified by the user/caller may be the predicted location, or alternatively, the current location from the user's response to the additional message.

FIG. 4 illustrates an embodiment of a method 400 for communication of location information, which may be performed for VoIP emergency calls. Method 400 may be implemented by a communication system described herein, such as system 100 of FIG. 1.

At block 401, a request for an emergency call is received by a UE and placed via either a WLAN or cellular network. The emergency call may be initiated by a user entering a special phone number, which can vary by jurisdiction, into the UE (e.g., 911, 112). Alternatively, the user may select a button or icon labelled "emergency" or similar. In response to receiving the emergency call request, the UE may determine how to route the emergency call. If the UE is a cellular phone, a home cellular network may first be checked for signal strength. Other cellular networks, which the UE would not have permission to use for non-emergency calls, may also be checked for signal strength. If no cellular network is available or has sufficient signal strength, if a WLAN connection, such as a WiFi connection, is available, the emergency call can be connected as a VoIP. In some embodiments, rather than a call, the communication via the WLAN may be a text message, such as an SMS or MMS message.

It may be possible for a UE to be moving yet only connected to a WLAN. For example, a UE may be connected with a vehicle's WLAN. Such a UE may not have a cellular interface or may be in a region where the signal strength of cellular networks is too low to be useable.

At block 402, in response to the emergency call or message initiated from a UE to the emergency number, first location information is obtained. The first location information is generated by the UE and indicates a first location of the UE when the call is initiated. At block 404, the first can be registered as the registered location, such as in RL database 192.

At block 406, a determination is made on whether the UE is moving. If the UE is determined to be in a static state (e.g., moving less than a threshold speed or velocity), method 400 ends, the registered location is not changed or updated, and the registered location information is sent to the PSAP. Block 406 can be performed based on repeated PIDF-LO messages received from the UE and analyzed, such as by EC router 191. At block 408, if the UE is determined to be moving greater than a threshold speed or velocity, a message is generated and sent to the UE. The message includes a request for updating the location of the UE when the UE stops moving.

At block 410, a second location is received from the UE, the second location indicating the current location of the UE of where the UE stopped.

At block 412, the second location and the first location are compared to determine whether the second location is different from the first location. At block 414, in response to a determination that the second location is different from the first location, the registered location for the UE in the registered location database is updated based on the second location.

Notably, components of system 100 can be implemented in the cloud, such as in a public cloud computing environment. FIG. 5 illustrates an embodiment of a cellular network core network topology 500 as implemented on a public cloud-computing platform, according to certain embodiments. The cellular network core network topology 500 can be an implementation of core 139 of FIG. 1. Cellular network core network topology 500 can represent how logical cellular network groups are distributed across cloud computing infrastructure of cloud computing platform 501. Cloud computing platform 501 can be logically and physically divided up into various different cloud computing regions 510. Each of cloud computing regions 510 can be isolated from other cloud computing regions to help provide fault tolerance, fail-over, load-balancing, and/or stability and each of cloud computing regions 510 can be composed of multiple availability zones, each of which can be a separate data center located in general proximity to each other (e.g., within 600 miles). Further, each of cloud computing regions 510 may provide superior service to a particular geographic region based on physical proximity. For example, cloud computing region 510-1 may have its data-centers and hardware located in the northeast of the United States while cloud computing region 510-2 may have its datacenters and hardware located in California. For simplicity, the details of the cellular network as executed in only cloud computing region 510-1 is illustrated. Similar components may be executed in other cloud computing regions of cloud computing regions 510 (510-2, 510-3, 510-n).

In other embodiments, cloud computing platform 501 may be a private cloud computing platform. A private cloud computing platform may be maintained by a single entity, such as the entity that operates the hybrid cellular network. Such a private cloud computing platform may be only used for the hybrid cellular network and/or for other uses by the entity that operates the hybrid cellular network (e.g., streaming content delivery).

Each of cloud computing regions 510 may include multiple availability zones 515. Each of availability zones 515 may be a discrete data center or group of data centers that allows for redundancy that allows for fail-over protection from other availability zones within the same cloud computing region. For example, if a particular data center of an availability zone experiences an outage, another data center of the availability zone or separate availability zone within the same cloud computing region can continue functioning and providing service. A logical cellular network component, such as a national data center, can be created in one or across multiple availability zones 515. For example, a database that is maintained as part of NDC 530 may be replicated across availability zones 515; therefore, if an availability zone of the cloud computing region is unavailable, a copy of the database remains up-to-date and available, thus allowing for continuous or near continuous functionality.

On a (e.g., public) cloud computing platform, cloud computing region 510-1 may include the ability to use a different type of data center or group of data centers, which can be referred to as local zones 520. For instance, a client, such as a provider of the hybrid cloud cellular network, can select from more options of the computing resources that can be reserved at an availability zone 515 compared to a local zone 520. However, a local zone 520 may provide computing resources nearby geographic locations where an availability zone 515 is not available. Therefore, to provide low latency, certain network components, such as regional data centers 540, can be implemented at local zones 520 rather than availability zones 515. In some circumstances, a geographic region can have both a local zone 520 and an availability zone 515.

In the topology of a 5G NR cellular network, 5G core functions of core 139 can logically reside as part of a national data center (NDC) 530. NDC 530 can be understood as having its functionality existing in cloud computing region 510-1 across multiple availability zones 515. At NDC 530, various network functions, such as NFs 532, are executed. For illustrative purposes, each NF 532, whether at NDC 530 or elsewhere located, can be comprised of multiple sub-components, referred to as pods (e.g., pod 511) that are each executed as a separate process by the cloud computing region 510. The illustrated number of pods 511 is merely an example; fewer or greater numbers of pods 511 may be part of the respective 5G core functions. It should be understood that in a real-world implementation, a cellular network core, whether for 5G or some other standard, can include many more network functions. By distributing NFs 532 across availability zones 515, load-balancing, redundancy, and fail-over can be achieved. In local zones 520, multiple regional data centers 540 can be logically present. Each of regional data centers 540 may execute 5G core functions for a different geographic region or group of RAN components. As an example, 5G core components that can be executed within an RDC, such as RDC 540-1, may be: UPFs 550, SMFs 560, and AMFs 570. While instances of UPFs 550 and SMFs 560 may be executed in local zones 520, SMFs 560 may be executed across multiple local zones 520 for redundancy, processing load-balancing, and fail-over.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known, processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for handling a voice over Internet protocol (VOIP) emergency call, the method comprising:
  receiving, by a telephony provider system, a VoIP emergency call made to a designated emergency phone number from a user equipment (UE) via a wireless local area network (WLAN);
  during the VoIP emergency call, obtaining, by the telephony provider system, location data from a presence information data format location object (PIDF-LO) tag;
  comparing the location data from the PIDF-LO tag with a registered location mapped to the UE, wherein the registered location is intended to correspond to an address at which the WLAN is installed;
  determining that the location data indicates a location more than a threshold distance away from the registered location; and based on determining that the location data indicates the location is more than the threshold distance away from the registered location, causing a registered location update request to be transmitted to the UE, wherein the registered location update requests an update to the stored registered location.

2. The method for handling the VoIP emergency call of claim 1, wherein the registered location update request provides an opportunity to accept or decline updating the stored registered location.

3. The method for handling the VoIP emergency call of claim 2, the method further comprising: in response to acceptance of the opportunity, causing a form to be transmitted to the UE into which an updated location is provided.

4. The method for handling the VoIP emergency call of claim 2, wherein the registered location update request is transmitted to the UE as a wireless application protocol (WAP) message.

5. The method for handling the VoIP emergency call of claim 2, wherein the registered location update request is transmitted to the UE as a short message service (SMS) message.

6. The method for handling the VoIP emergency call of claim 1, further comprising:
  determining a public safety answering point (PSAP) to which to route the VoIP emergency call; and
  routing the VoIP emergency call to the PSAP.

7. The method for handling the VOIP emergency call of claim 6, further comprising:
  transmitting an indication to the determined PSAP indicating that the registered location does not match the location data obtained from the PIDF-LO tag.

8. The method for handling the VoIP emergency call of claim 1, wherein the location data is created by the UE using global navigation satellite system (GNSS) coordinates and a barometric pressure measurement.

9. A system for handling a voice over Internet protocol (VOIP) emergency call, the system comprising:
  a telephony provider system, comprising a VoIP call engine and an emergency call router system, the telephony provider system configured to:
    receive a VoIP emergency call made to a designated emergency phone number from a user equipment (UE) via a wireless local area network (WLAN);
    during the VoIP emergency call, obtain location data from a presence information data format location object (PIDF-LO) tag;
    compare the location data from the PIDF-LO tag with a registered location mapped to the UE, wherein the registered location is intended to correspond to an address at which the WLAN is installed;
    determine that the location data indicates a location more than a threshold distance away from the registered location; and
    cause a registered location update request to be transmitted to the UE based on determining that the location data indicates the location is more than the threshold distance away from the registered location, wherein the registered location update requests an update to the stored registered location.

10. The system of claim 9, wherein the registered location update request provides an opportunity to accept or decline updating the stored registered location.

11. The system of claim 10, wherein in response to acceptance of the opportunity, the telephony provider system causes a form to be transmitted to the UE into which an updated location is provided.

12. The system of claim 10, wherein the registered location update request is transmitted to the UE as a wireless application protocol (WAP) message.

13. The system of claim 10, wherein the registered location update request is transmitted to the UE as a short message service (SMS) message.

14. The system of claim 10, wherein the telephony provider system further comprises a cellular network.

15. The system of claim 10, wherein the location data is created by the UE using global navigation satellite system (GNSS) coordinates and a barometric pressure measurement.

16. The system of claim 9, wherein the telephony provider system is further configured to:

determine a public safety answering point (PSAP) to which to route the VOIP emergency call; and route the VoIP emergency call to the PSAP.

17. The system of claim 16, wherein the telephony provider system is further configured to transmit an indication to the determined PSAP indicating that the registered location does not match the location data obtained from the PIDF-LO tag.

18. A non-transitory processor-readable medium, comprising processor-readable instructions configured to cause one or more processors to:

receive a VoIP emergency call made to a designated emergency phone number from a user equipment (UE) via a wireless local area network (WLAN);

during the VoIP emergency call, obtain location data from a presence information data format location object (PIDF-LO) tag;

compare the location data from the PIDF-LO tag with a registered location mapped to the UE, wherein the registered location is intended to correspond to an address at which the WLAN is installed;

determine that the location data indicates a location more than a threshold distance away from the registered location; and cause a registered location update request to be transmitted to the UE based on determining that the location data indicates the location is more than the threshold distance away from the registered location, wherein the registered location update requests an update to the stored registered location.

\* \* \* \* \*